Figure 1:
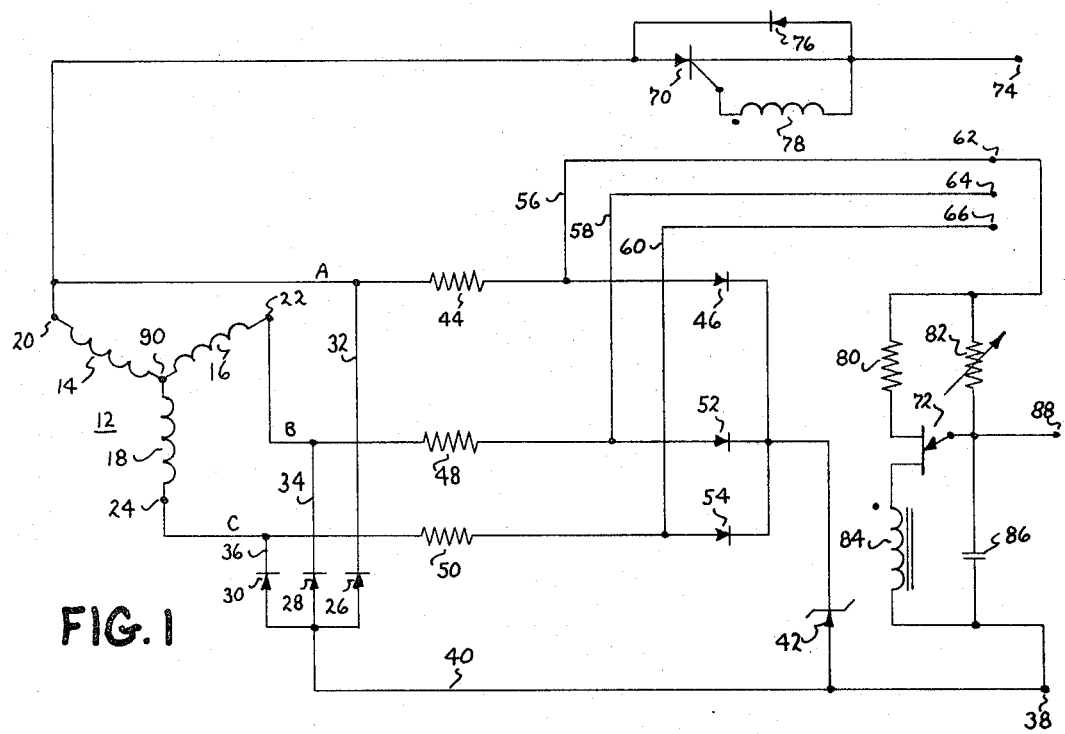

May 14, 1968  G. M. ROSENBERRY, JR  3,383,581
POWER SUPPLY HAVING SYNCHRONOUS PERIODIC OUTPUT VOLTAGE
Filed July 18, 1966

INVENTOR.
GEORGE M. ROSENBERRY, JR.
BY James C. Davis Jr.
HIS ATTORNEY

United States Patent Office 3,383,581
Patented May 14, 1968

3,383,581
POWER SUPPLY HAVING SYNCHRONOUS
PERIODIC OUTPUT VOLTAGE
George M. Rosenberry, Jr., Schenectady, N.Y., assignor to General Electric Company, a corporation of New York
Filed July 18, 1966, Ser. No. 565,781
7 Claims. (Cl. 321—16)

The present invention relates to power supplies having an intermittent output and, more specifically, pertains to power supplies of this kind operated from a polyphase source of electric power and synchronized with the voltage of one or more phases thereof.

It is oftentimes necessary or highly desirable in electric systems to provide a supply of substantially constant voltage only during interval synchronized with predetermined excursions of the periodically varying voltage of one phase of a polyphase source. For example, in controlled rectifier systems coupled to a polyphase source, such a supply for the various firing, or trigger, circuits enables reliable synchronous operation of the controlled rectifiers and additionally resets the firing circuits once each cycle whether or not a trigger pulse was provided during the preceding cycle. In this way, an accurate time reference is provided for the firing circuits and an otherwise troublesome source of system instability is obviated.

In most electrical systems the voltages and correponding currents are displaced in time, or out of phase with each other. The current oftentimes lags and sometimes leads the corresponding forcing voltage. The usual firing circuits respond to voltage, whereas the associated power-controlling devices more often function in dependence upon current. For this reason, among others, it is highly desirable to provide a supply of operating voltage to the firing circuits for a period longer than one half of each cycle, or more than 180 electrical degrees, of source voltage. The supply voltages are preferably symmetrically centered relative to a peak of the individual phase voltages. By so doing, the complete range of control possible with a particular system can be realized.

Heretofore known power supplies for providing an intermittent supply voltage symmetrically centered relative to individual phase voltages of a polyphase source have depended for proper operation upon a particular connection to the polyphase source for establishing a desired phase sequence. Improper connection of the source results in an incorrect phase relationship in the firing circuits and likely excessive current, unbalanced firing signals and other disadvantageous conditions. Reliability and ordinary prudence both suggest inclusion of phase-reversal protection and other protective means as necessary ancillary features of such power supplies. It would be highly desirable to obviate this infirmity of known otherwise suitable power supplies and to provide one featuring independence of the phase connection sequence.

Accordingly, a principal object of this invention is to provide a power supply having an intermittent output voltage symmetrically centered relative to the voltage of one phase of a polyphase source so that the voltage can be used as a reference independent of the phase sequence of connection to the polyphase source.

A further object of the invention is to provide a power supply of the foregoing kind wherein the supplied voltage is substantially constant in magnitude for a duration corresponding to more than 180 electrical degrees of each cycle.

Briefly, in accordance with an embodiment of the present invention, a reference potential is established, by means including a plurality of unidirectionally conducting devices, which corresponds in magnitude to the negative envelope of the source of polyphase voltage. A single substantially constant voltage device and a plurality of impedances and additional unidirectionally conducting devices combine to provide an output voltage, relative to the reference, corresponding to the voltage of the constant voltage device whenever a selected phase voltage departs substantially from the reference potential, or negative envelope. In this way, a substantially constant output voltage symmetrically centered about the positive peak of the selected phase voltage is provided. The duration of supplied voltage is approximately 240 electrical degrees in the usual case of a three-phase source, for example, and the timing of the output voltage relative to the selected phase voltage is not dependent upon any particular phase connection sequence.

Figure 2:
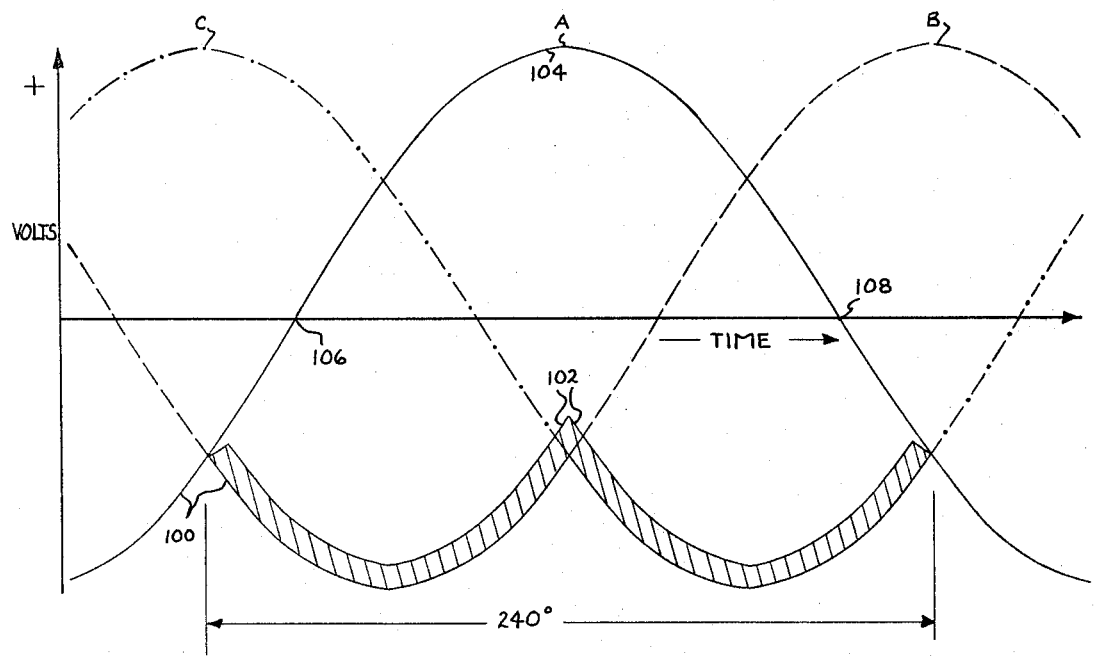

While the specification concludes with claims particularly pointing out and distinctly claiming the subject matter which I regard as my invention, it is believed the invention will be better understood from the following description taken in connection with the accompanying drawings in which:

FIGURE 1 is a schematic circuit diagram of a preferred embodiment of the invention; and FIGURE 2 is a graph of voltages versus time, useful in explaining the operation of the circuit illustrated in FIGURE 1.

The polyphase source 12 of alternating-current power illustrated in FIGURE 1 comprises a plurality of windings 14, 16 and 18 connected in the Y configuration and having output terminals 20, 22 and 24. The source 12 shown has three phases conventionally designated by the letters A, B and C and corresponding to the outputs available at terminals 20, 22 and 24, respectively. Windings 14, 16 and 18 can be the output windings of a three-phase alternating-current generator or power transformer, for example. While a Y connection is shown in the diagram, those skilled in the art will appreciate that the equally conventional delta connection similarly can be employed, as well as sources having more phases.

In accord with the present invention, a point of common reference voltage is established corresponding in magnitude to one of the two envelopes of the polyphase source 12, selected to be the envelope of negative polarity in FIGURE 1. Toward this end, unidirectionally conducting devices, as rectifier diodes 26, 28 and 30, have similar electrodes, selected to be the cathodes, respectively connected to source 12 output terminals 20, 22 and 24 by means of conductors 32, 34 and 36. The anodes of diodes 26, 28 and 30 are connected together and to a power supply reference terminal 38 by means of a conductor 40.

The power supply is completed by a single substantially constant voltage device, that is conveniently selected to be a Zener diode 42, as shown, and an impedance and diode connected in series from each phase to the diode 42. Zener diode 42 can be replaced by a battery or other low impedance voltage source, if more advantageous in special applications. Toward achieving the latter objective, resistance 44 is connected from terminal 20 to Zener diode 42 by means of a diode 46. The cathode of diode 46 is connected to the cathode of Zener diode 42. It will occur to those skilled in the art that the latter two diodes can be integrated in a single semiconductive package, as well as provided in the form of separate components as shown. Similarly, resistances 48 and 50 are connected respectively from terminals 22 and 24 to Zener diode 42 by means including respective diodes 52 and 54. Diodes 52 and 54 can also be integrated into a single semiconductive device with Zener diode 42. The power supply of this invention is completed by means for coupling the power from each of the three series circuits described to power utilization means. Conductors 56, 58 and 60 connected respectively from the junction of resistance 44 and diode 46, resistance 48 and diode 52 and resistance 50 and diode 54, to respective output terminals 62, 64 and 66 conveniently provide the power supply output means.

A typical environment for the power supply is illustrated by power controlling means including a triggerable semiconductive device, as silicon-controlled rectifier (SCR) 70, and a suitable trigger circuit therefor including unijunction transistor 72. The anode of SCR 70 is connected to terminal 20 of the polyphase source 12, and the cathode of SCR 70 is connected to a power output terminal 74. A power diode 76 is connected in parallel with SCR 70 to conduct current in the reverse direction, in accord with conventional practice. A pulse transformer secondary winding 78, connected from the cathode to the gate electrode of SCR 70, provides means for initiating conduction in SCR 70, as is well known.

The firing, or trigger, circuit including unijunction transistor 72 has resistances 80 and 82 respectively connected from base-two and the emitter of unijunction transistor 72 to power supply output terminal 62. A pulse transformer primary winding 84 and capacitance 86 are respectively connected from the base-one and emitter of unijunction transistor 72 to the common reference terminal 38 of the power supply. It is primary winding 84 that is electromagnetically coupled to the aforementioned secondary winding 78. Means for controlling the timing in the firing circuit can include a control voltage or current input terminal 88 coupled to the emitter of unijunction transistor 72. Alternatively, resistance 82, that is shown to be variable, can be replaced by a transistor, for example. There would be correspondingly connected power controlling means and firing circuits for the other phases of source 12 in the more usual case; however, the circuits illustrated suffice for purposes of description.

In operation, the power supply shown in FIGURE 1 provides a pulse of voltage, between terminals 62 and 38, having a magnitude which is substantially constant and equal to the reverse breakdown voltage of Zener diode 42. The pulse is essentially centered in time of existence, or in the time domain, about the peak positive excursion of the phase A voltage at terminal 20 relative to any convenient reference point, typically the neutral point 90 for source 12. In the embodiment shown, the pulse commences approximately 30 electrical degrees prior to the positive crossing of the zero reference line by the phase A voltage, continues throughout the positive half-cycle, and lingers for approximately 30 electrical degrees after the negative-going crossing of the axis of the phase A voltage. The foregoing is illustrated in the graph of FIGURE 2 wherein the customary letters A, B and C designate the line-to-neutral voltages at respective terminals 20, 22 and 24 of FIGURE 1.

The negative envelope, as it is known, of the phase voltages is traced by line 100 and follows a continuous path representing the negative-most phase voltage at all times. The voltage at terminal 38 corresponds in magnitude to, and in the illustrated embodiment is equal to (neglecting the forward voltage drop of the diodes), the voltage of the negative envelope 100 of source voltages. Curve 102 represents the voltage at terminal 62. The difference between curves 100 and 102 represents the power supply output voltage and is shaded on the graph. The difference corresponds in magnitude to the breakdown voltage of the Zener diode 42. Because only differences in voltages are detectable, the output voltage at terminal 62 relative to terminal 38 appears as an approximately rectangular pulse of energy.

The duration of the output pulse is substantially equal to, but less than, 240 electrical degrees. The occurrence of the pulse is symmetrically centered relative to the positive peak 104 of the phase A voltage and is independent of the order of occurrence, or sequence, of the phase B and C voltages. Changes in the sequence of the latter do not affect the negative envelope 100 that serves as the reference potential. The pulse is initiated substantially 30 electrical degrees prior to, or leading, the positive crossing 106 of phase A and continues until substantially 30 electrical degrees after, or lagging, the negative crossing 108 thereof. The actual extent of leading and lagging depends primarily on the ratio of the voltage magnitude of the substantially constant voltage device, or reverse breakdown voltage of the Zener diode in the illustrative embodiment, to the peak phase voltage. The smaller the aforementioned ratio, the greater will be the lead and lag, and vice versa. The reason for this is that the pulse is not initiated or terminated until the extent of departure of phase A voltage from the envelope voltage is essentially equal to the magnitude of the substantially constant voltage. In most practical cases, the aforementioned ratio is very small indeed, and seldom exceeds $\frac{1}{10}$. The peak phase voltage magnitude is selected to be more than two times greater than the magnitude of the constant voltage to provide the desired lead and lag relationships.

The positive half-cycle of the phase A voltage represents the approximate interval during which SCR 70 can be triggered into a conductive state, although some relatively small translation in time is ordinarily present because of leading or lagging current characteristics of the system served. The power supply of this invention applies power to the trigger circuit and initiates charging of capacitance 86 in time to take full advantage of the available span of control from maximum conduction to minimum or no conduction. At the same time, a quiescent, or zero voltage, condition is established by collapse of the voltage for at least 120 electrical degrees per cycle, giving any transient disturbances in the firing circuit ample time to be dissipated and preventing spurious trigger signals. An accurate time reference for synchronizing operation of the trigger circuit with the source voltage occurs when the power supply abruptly applies power to the firing circuit. The time of initiation relative to the phase A voltage is seen to be independent of whether time progresses in the direction shown in FIGURE 2 or is reversed, corresponding to a change in phase sequence. A similar output voltage referenced to the positive envelope of the the polyphase source is conveniently provided by reversing the connection of each diode in FIGURE 1, including Zener diode 42.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

What I claim as new and desire to secure by Letters Patent of the United States is:

1. An electric power supply derived from a polyphase source of electric power, said power supply comprising:
   (a) first rectifying means connected to said polyphase source and to a common reference terminal establishing a voltage at said terminal substantially equal to the instantaneous maximum voltage of a predetermined polarity from said source;
   (b) an impedance, second rectifying means and a substantially constant voltage device connected in series circuit relationship in the order recited from one phase of said polyphase source to said reference terminal; and,
   (c) output means coupled to the junction of said impedance and said second rectifying means for providing a substantially constant output voltage relative to said reference terminal only during intervals of time when the voltage of said one phase differs in magnitude from the voltage at said reference terminal by a value greater than the constant voltage of said substantially constant voltage device, whereby the time of initiation of output voltage pulses from said power supply relative to said one phase voltage is independent of the phase sequence.

2. The power supply of claim 1 wherein said substantially constant voltage device is a Zener diode.

3. The power supply of claim 2 wherein said first and second rectifying means and said Zener diode each have anode and cathode connections, and the anode connection of said Zener diode is connected to the anode connection of said first rectifying means and the cathode connection of said Zener diode is connected to the cathode connection of said second rectifying means.

4. The power supply of claim 1 wherein said first rectifying means comprises a plurality of diodes having cathodes respectively connected to each phase of said polyphase source, and having anodes connected together and to said reference terminal.

5. A trigger circuit power supply for use with a polyphase source of electric power having a plurality of phase output terminals, said power supply comprising:
 (a) first rectifying means comprising a plurality of diodes having anode and cathode electrodes, means connecting a similar electrode of each of said diodes respectively to said terminals, means connecting the other of said electrodes together and to a voltage reference terminal for the power supply;
 (b) a Zener diode having an anode and a cathode electrode, means connecting the electrode of said Zener diode that is similar to said other of the electrodes in said first rectifying means to said voltage reference terminal;
 (c) a plurality of impedances respectively connected to the output terminals of said polyphase source;
 (d) second rectifying means comprising a plurality of diodes having anode and cathode electrodes, means connecting a similar electrode of each of said last-mentioned diodes respectively to said impedances, said last-mentioned similar electrode being different from said similar electrode selected in said first rectifying means; means connecting the other electrodes of said second rectifying means together and to the similar electrode of said Zener diode; and,
 (e) power supply output means connected respectively to the junctions of said impedance and said second rectifying means.

6. The power supply of claim 5 wherein the reverse breakdown voltage of said Zener diode is selected to be less than one tenth of the magnitude of peak line voltage from said polyphase source.

7. A power supply derived from a polyphase source and characterized by a voltage output waveform symmetrically centered relative to one line voltage of said source independent of the relative phase rotation thereof and collapsing to zero once per cycle, said power supply comprising:
 (a) a plurality of unidirectionally conductive devices having anodes and cathodes, means connecting one of said anodes and said cathodes to a common reference terminal and means connecting the other of said anodes and cathodes respectively to the phases of said source other than said one phase thereof;
 (b) an impedance, another unidirectionally conducting device, and a substantially constant voltage breakdown device connected in series circuit relationship in the order mentioned from said one phase to said common reference terminal, said last-mentioned unidirectionally conducting device and constant voltage breakdown device being arranged and connected to permit conduction of current in said series circuit and establishment of a substantially constant voltage across said substantially constant voltage breakdown device only when the voltage of said one phase is of a predetermined polarity relative to the voltage of any of said other phases; and,
 (c) means for coupling a power utilization means to said common reference terminal and to said series circuit intermediate said impedance and said substantially constant voltage breakdown device, whereby power is supplied to said utilization means at intermittent intervals synchronized symmetrically relative to the peak voltage excursion of said one phase.

References Cited

UNITED STATES PATENTS

| | | | |
|---|---|---|---|
| 3,009,091 | 11/1961 | Hallidy | 322—28 |
| 3,134,068 | 5/1964 | Feltman | 321—5 XR |
| 3,289,071 | 11/1966 | Rosenberry | 321—8 XR |
| 3,299,342 | 1/1967 | Rath | 322—28 |
| 3,314,001 | 4/1967 | Brockman | 322—73 |

JOHN F. COUCH, *Primary Examiner.*

WARREN E. RAY, *Examiner.*

W. M. SHOOP, Jr., *Assistant Examiner.*